(12) United States Patent
Auten et al.

(10) Patent No.: US 8,087,648 B2
(45) Date of Patent: Jan. 3, 2012

(54) HYDRAULIC BUSHING

(75) Inventors: Jeffrey D. Auten, West Bloomfield, MI (US); Juergen Weitzmann, Novi, MI (US); Jin Kyu Han, Ann Arbor, MI (US); Robert P. Church, Plymouth, MI (US)

(73) Assignee: ZF Group North American Operations, Inc., Northville, MI (US)

( * ) Notice: Subject to any disclaimer, the term of this patent is extended or adjusted under 35 U.S.C. 154(b) by 0 days.

(21) Appl. No.: 12/355,217

(22) Filed: Jan. 16, 2009

(65) Prior Publication Data

US 2009/0178893 A1 Jul. 16, 2009

Related U.S. Application Data

(60) Provisional application No. 61/021,460, filed on Jan. 16, 2008.

(51) Int. Cl.
*F16F 13/00* (2006.01)

(52) U.S. Cl. ................. 267/140.12; 267/141.2

(58) Field of Classification Search ............. 267/140.12, 267/141.2–141.7
See application file for complete search history.

(56) References Cited

U.S. PATENT DOCUMENTS

| | | | |
|---|---|---|---|
| 4,667,942 A | 5/1987 | Bitschkus et al. | |
| 4,872,651 A | 10/1989 | Thorn | |
| 4,964,623 A | 10/1990 | Thorn | |
| 6,644,633 B2 | 11/2003 | Graeve | |
| 6,651,965 B1* | 11/2003 | Vossel et al. | 267/140.12 |
| 7,198,256 B2 | 4/2007 | Tatura et al. | |
| 2003/0151178 A1* | 8/2003 | Vossel et al. | 267/140.12 |

FOREIGN PATENT DOCUMENTS

| | | |
|---|---|---|
| JP | 2004518927 | 6/2004 |
| JP | 2005507065 | 3/2005 |

* cited by examiner

*Primary Examiner* — Christopher Schwartz
(74) *Attorney, Agent, or Firm* — Gifford, Krass, Sprinkle, Anderson & Citkowski, P.C.

(57) ABSTRACT

A hydraulic bushing including an elastomeric bellows having radially spaced axially extending arcuate chambers fluidly connected with axially spaced radially extending chambers to dampen axial as well as radial loads imposed upon the bushing.

4 Claims, 2 Drawing Sheets

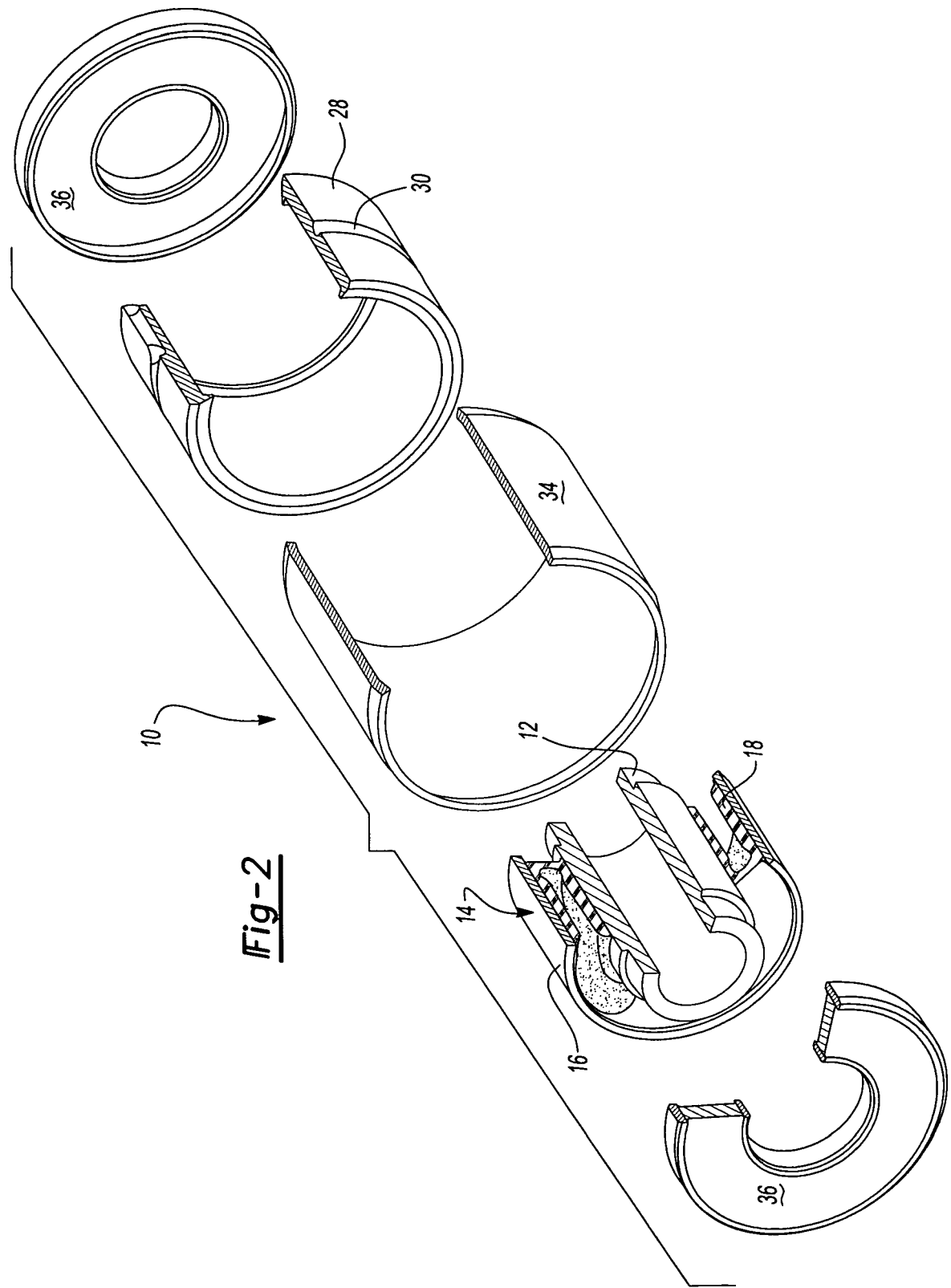

HYDRAULIC BUSHING

CROSS-REFERENCE TO RELATED APPLICATIONS

This Application is a Non-Provisional application based upon Provisional application Ser. No. 61/021,460 filed on Jan. 16, 2008, which is herein incorporated by reference.

FIELD OF THE INVENTION

The present application relates to bushings and more particularly to a bushing providing radial and axial damping.

BACKGROUND OF THE INVENTION

Bushings are used throughout complex machinery such as motor vehicles. Bushings typically provide radial or axial damping between two components. For example, a stabilizer bar can include bushings that are used as part of the attachment of the bar to a chassis system of the motor vehicle. Such bushings can be made from solid rubber or other elastomer materials and desirably provide radial damping for the connection to the stabilizer bar.

An improvement over traditional bushings is a hydraulic bushing that uses a fluid to improve the damping characteristics thereof. However, heretofore hydraulic bushings have not provided radial and axial damping within one bushing. Therefore, a hydraulic bushing with combined radial and axial damping would be desirable.

SUMMARY OF THE INVENTION

The present invention discloses a hydraulic bushing that provides combined radial and axial damping. As such, the hydraulic bushing has utility as a component for a motor vehicle as well as for other machinery having connections subject to both axial and radial loads and where both axial and radial damping would be advantageous.

The hydraulic bushing of the present invention can include molded components that can be calibrated or swedged from the outer diameter in order to relieve internal stress in the bushing material, e.g. rubber or other elastomer materials. As such, this construction greatly improves the durability of the hydraulic bushing.

The bushing preferably includes a generally cylindrically shaped inner sleeve dimensioned to accept a rod, shaft, etc., and a damping member disposed over the inner sleeve, the damping member having a generally arcuate shaped bellows that includes at least two axially extending arcuate shaped chambers with a first chamber being oriented substantially 180° with respect to a second chamber along a central bushing axis. The arcuate chambers are at least partially filled with a fluid and axially spaced chambers are provided which are in fluid communication with the arcuate chambers and with each other such that axial loads are dampened by fluid in the axially spaced chambers and radial loads are dampened by the fluid in the arcuate chambers.

The damping member is mounted within a tubular cover that is provided with a channel in fluid communication with the arcuate chambers and the axially spaced chambers. An outer housing is included, the tubular cover being disposed within and encased by the outer housing. The bushing also includes a pair of end members that with the outer housing seal the damping member from the surrounding environment.

BRIEF DESCRIPTION OF THE DRAWINGS

A better understanding of the present invention will be had upon reference to the following drawings in which;

FIG. 2 is an exploded view of the bushing of the present invention with portions in cross section.

DETAILED DESCRIPTION OF THE PREFERRED EMBODIMENT

Figure 1:
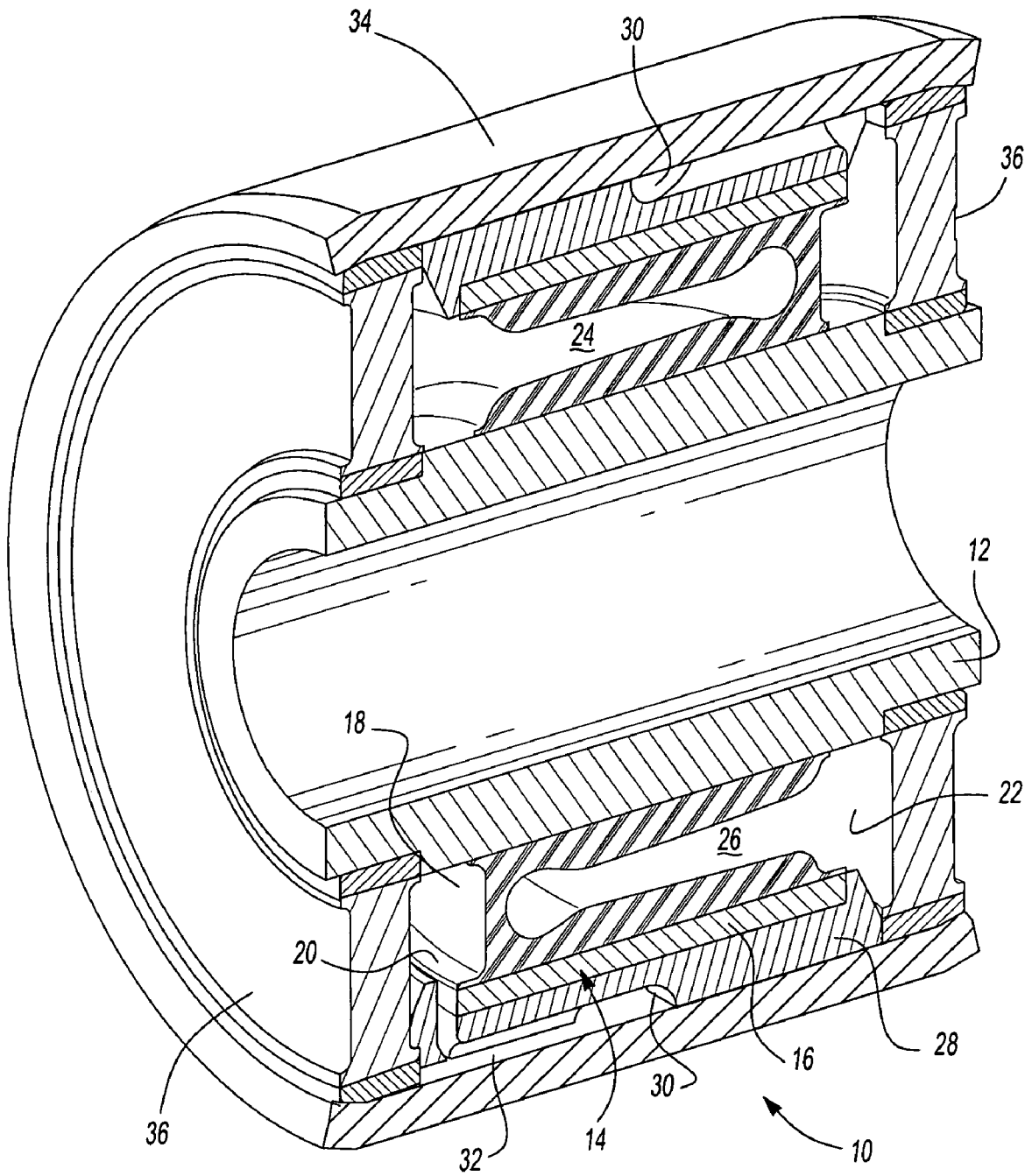
FIG. 1 is a longitudinal cross sectional view of the bushing of the present invention.

Turning now to FIGS. 1 and 2, a bushing of the present invention is shown generally at reference numeral 10. The bushing 10 includes an inner sleeve 12 having an internal diameter dimensioned to accept a rod, shaft, tube or the like. Adjacent to and in contact with the inner sleeve 12 is a damping member 14.

The damping member 14, as can best be seen in FIG. 1, includes an outer sleeve 16 and a bellows 18 preferably constructed of an elastomeric material positioned between the inner sleeve 12 and the outer sleeve 16. Still referring to FIG. 1, radially extending chambers 20 and 22 are formed within the damping member 14 and are axially spaced to be positioned at each end of the bellows 18. Axially extending arcuate chambers 24 and 26 are formed in the bellows 18 and are radially spaced around the inner sleeve 12. The chambers 24 and 26 are fluidly connected to chambers 20 and 22 respectively.

The damping member 14 is mounted within a tubular cover 28. The cover 28 is provided with a fluid channel 30, which communicates with the annular chamber 20 through a passageway 32 (FIG. 1). A fluid path is therefore provided between the channel 30 and the bellows 18 to permit a fluid such as oil, water, hydraulic fluid and the like to be within the hydraulic bushing 10 and pass from one location within the damping member 14 to another location in the damping member 14 in response to changes in the axial or radial load on the bushing 10 and thus provide a hydraulic damping effect.

As illustrated in the drawings the fluid in chambers 20 and 22 provide damping to axial loads imposed upon the bushing 10 and the chambers 24 and 26 provide damping to radial loads. It should be apparent that although the damping member 14 has been provided with two axially extending arcuate chambers 24 and 26 that with some modifications a single chamber extending circumferentially around the bellows 18 would also provide the necessary radial damping.

A housing 34 and end caps 36 enclose the damping member 14 and seal the hydraulic bushing 10 so that fluid within the bushing 10 is prevented from escaping and water, dust, dirt, grit and the like is prevented from entering the damping member 14. The ends of the housing 34 are preferably swadged over the end caps 36 in final assembly of the bushing 10.

The inner sleeve 12 can be made from any material known to those skilled in the art, illustratively including metals, alloys, plastics, ceramics and combinations thereof. The bellows 18 of the damping member 14 is typically made from, at least in part, an elastomer such that resilient movement is produced in response to fluid movement caused by changing loads on the bushing 10. As such, the bellows 18 can be made from rubber, synthetic rubber, and other polymers that provide desired resiliency. The tubular cover 28 can also be made from any material known to those skilled in the art, illustratively including metals, alloys, ceramics, plastics and combinations thereof. In a preferred form it is made from plastic. The end caps 36, the housing 34, the outer sleeve 16 are preferably molded pieces.

It should be apparent that a construction for a bushing has been provided which dampens both axial loads and radial loads imposed on the bushing 10 by the connection in which the bushing 10 is used. Axial loads on the bushing 10 are transmitted through the inner sleeve 12 to the damping member 14 to urge the bellows 18 of the damping member 14 axially within the housing 34. Axial loads are opposed by the fluid in the chambers 20 and 22 while radial loads transmitted through the inner sleeve 12 to the damping member 14 are opposed by the resilient bellows 18 and the arcuate chambers 24 and 26.

It should also be apparent to one skilled in the art that the description and the drawings are provided for illustrative purposes only. Thus, one skilled in the art would know to make modifications, adjustments and the like to the described embodiment and still be within the scope of the present invention. As such the scope of the invention is not defined by the description and drawings but by the claims below.

We claim:

1. A hydraulic bushing for providing radial and axial damping, said hydraulic bushing comprising:
    an inner sleeve dimensioned to accept a cylindrical member;
    a damping member mounted over said inner sleeve such that loads imposed upon said sleeve are transmitted to said damping member;
    said damping member including a bellows having a pair of arcuately spaced, axially extending chambers extending axially oppositely from each other and with each of said chambers open at opposite ends of said bellows and closed at the end opposite the open end;
    said damping member being provided with a pair of axially spaced arcuate chambers,
    each of said axially extending chambers being fluidly connected with each other and with a different one of said arcuate chambers; and
    said chambers being provided with a fluid and being fluidly connected to one another whereby an axial load imposed on said sleeve is opposed by fluid in said axially extending chambers and a radial load on said sleeve is opposed by fluid in said arcuate chambers.

2. The bushing as defined in claim 1 and further comprising a tubular cover disposed over said damping member;
    a fluid channel extending circumferentially around said tubular cover; and
    said channel being in fluid communication with one of said axially arcuate chambers.

3. The bushing as defined in claim 1 and which said bellows is constructed of an elastomeric material.

4. The bushing as defined in claim 1 and further comprising;
    a housing enclosing said damping member;
    axially spaced end caps mounted to said housing to seal said bushing; and
    said housing being swaged to said end caps.

* * * * *